March 8, 1932.  R. FÖHRENBACH  1,848,470
GLASS BEVELING MACHINE
Filed Jan. 15, 1929  2 Sheets-Sheet 1
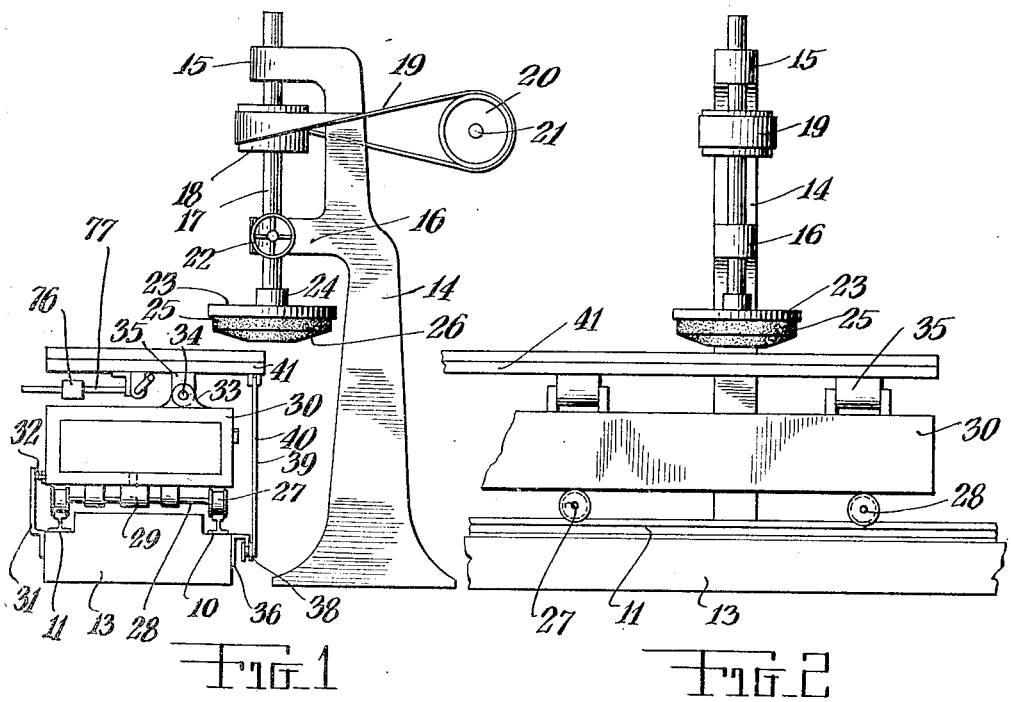
INVENTOR
R. Föhrenbach
BY his
F. Ledermann
ATTORNEY March 8, 1932.  R. FÖHRENBACH  1,848,470

GLASS BEVELING MACHINE

Filed Jan. 15, 1929   2 Sheets-Sheet 2

INVENTOR
R. Föhrenbach
BY his
F. Ledermann
ATTORNEY

Patented Mar. 8, 1932

1,848,470

UNITED STATES PATENT OFFICE

RUDOLF FÖHRENBACH, OF OFFENBURG IN BADEN, GERMANY, ASSIGNOR TO WOLFGANG GRETHMANN, OF NEW YORK, N. Y.

GLASS BEVELING MACHINE

Application filed January 15, 1929. Serial No. 332,714.

The main object of this invention is to provide a machine whose purpose is to form the beveled edges on sheet or plate glass. The organization of the assembly is such that one edge of a plate glass is presented to a beveling wheel successively after another in continuous fashion thus performing an endless operation.

Another object of this invention is an apparatus provided for beveling the edges of plate glass provided with carriages mounted on an endless track which are capable of being adjustably tilted to the angle desired on the plate glass. The glass sheets may not only be tilted to the same angle; the same angle may be beveled on sheets of glass of different thicknesses on the same wagon.

A further object is to provide a glass beveling machine provided with mobile carrier wagons, each wagon being capable of receiving sheets of glass of different thicknesses and may be tilted simultaneously for the same beveling process.

Still another object of this invention is to provide a glass beveling machine having plate glass conveyor carriages which are provided with suction cups formed around the edges of the carriage body which normally create a vacuum beneath the plate glass for the purpose of holding the glass to be worked in position.

The above and other objects will become apparent in the description below, in which characters of reference refer to like-named parts in the drawings.

Referring briefly to the drawings, Figure 1 is a side elevational view of the grinding apparatus showing the glass carrying carriage passing the same.

Figure 2 is a front elevational view of Figure 1 with the carriage in front of the grinding apparatus.

Figure 3:
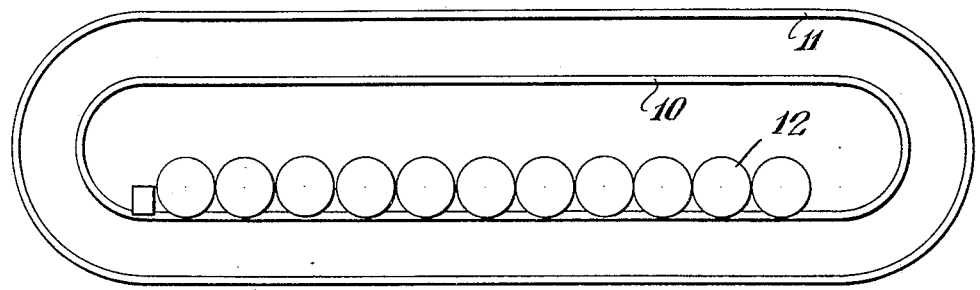
Figure 3 is a top plan view of the track showing the arrangement of the grinding units and the track.
Figure 4:
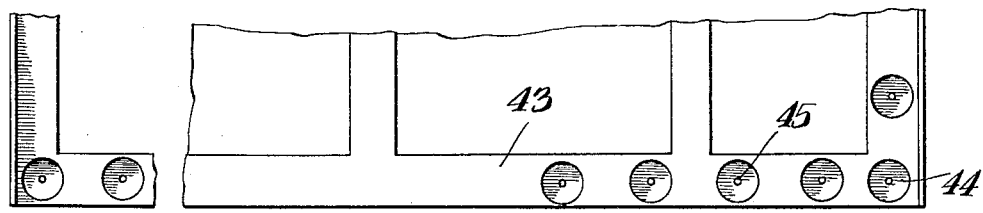
Figure 4 is a fragmentary top plan view of the glass carrying carriage table.
Figure 5:
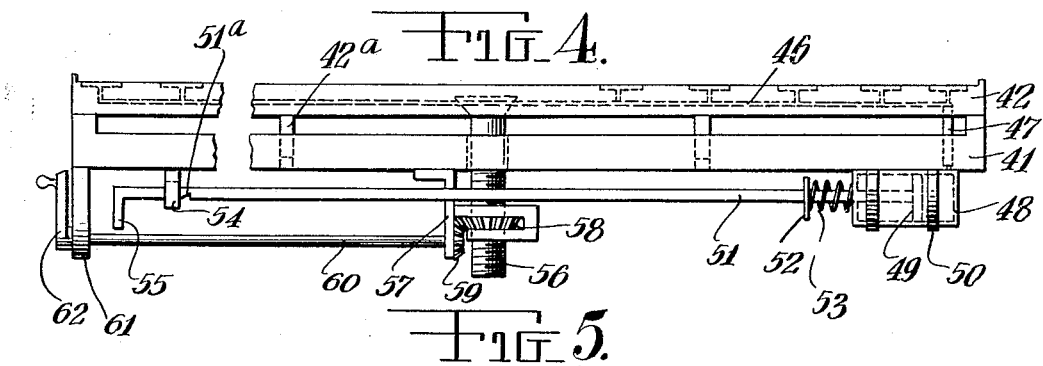
Figure 5 is a side elevational view of Figure 6 showing the arrangement of the vacuum cups for holding the glass upon the table and means for lifting said table.
Figure 6:
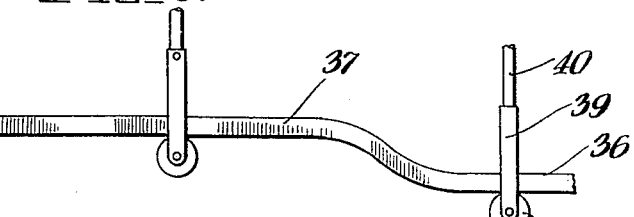
Figure 6 is a side elevational view of the carriage table tilting track.

Referring in detail to the drawings, the numeral 10 indicates the inner rail track. An outer rail 11 extends parallel to the inner rail. These rails are formed endlessly by providing curves at the ends, and at the back where no grinding units 12 are located the work is loaded upon the carriages, which will be more fully hereinafter described, the latter being automatically or manually caused to ride on the rails in front of the grinding units. These rails are mounted upon a raised bed 13. The grinding units are located adjacent the inner rail 10 and consist of an upright pedestal 14 which has a pair of spaced-apart arms 15 and 16 extending sidewise therefrom. These arms have aligned openings through which a spindle 17 passes. The spindle is rotatable and is provided with a pulley 18 around one-half of which a belt 19 is trained. This belt extends and is trained about a driving pulley 20 which is mounted upon the counter shaft 21 located at any desirable position suitable for the pulley of the grinding unit. A hand wheel 22 is located on the lower arm 16 and is adapted to raise or lower the spindle 17 into position to perform work. The lower end of the spindle has a face plate 23 or similar other contrivance mounted thereon. This face plate is provided with a hub 24 directly secured to the lower end of the spindle 17. The face plate 23 is provided with a rim and receives an emery or carborundum wheel 25 which has its lower active face formed conically, as indicated by the numeral 26, and this conical surface is adapted to impart a beveled edge to the glass which lies upon the tables of the carriages. The carriages comprise wheeled bodies which are mounted on the rails and are provided with pivoted trucks comprising flanged rollers 27 mounted on an axle 26. The axle is supported in a pivotal block 29 and is secured to the under surface of a rectangular hollow body 30 of the carriage. To prevent a transverse shifting of the carriage on the rails an apron 31 rises from the bed 13, upon which the rails are supported, and serves as a buffer having wheels 32 riding on its side, said wheels being rotatably located on the side of the body 30 of the carriage. At various positions along the length of the body 30 pairs of ears 33 are provided across which pins 34 span. These pins have lugs 35 supported thereon. The lugs form part of the carriage table and are adapted to tiltably support the same. To adjust the degree of bevel at the edge of a piece of plate glass being worked this table is tilted. It will be noted from Figure 1 that the table of the carriage is not perfectly balanced as the lugs 35 are offset to one side of the table. The offset setting of the lugs 35 to one side of the table is so located to provide a desired amount of pressure of the loaded table against the surface of the grinding wheel 25. This function may be increased a variable amount by an overbalancing weight 76 slidable on the stud 77. This unbalanced condition of the table requires that a mechanism be provided which retains the table in adjusted position. This mechanism consists of a substantially straight track 36 mounted on the side of the bed 13 and rises to a higher level such as indicated by the numeral 37, in front of each grinding unit, as indicated in Figure 8. The track 36, see Figure 8, serves as a guideway for a roll 38 mounted at the lower end of a hollow arm 39 which telescopes upon a rod 40 and may be locked by any desirable means along the entire length of this rod so that various inclined positions of the table may be had. The rod is pivotally secured to the base plate 41 of the table. The base plate 41 of the table supports the table 42 properly. This table is of skeleton construction and around its edge or in the members 43 forming this skeleton table a plurality of spaced-apart annular cups 44 are formed. These cups are provided with vents 45 which communicate with a main suction canal 46. The latter extends and communicates with a sleeve 47 which is slidably mounted in an opening in the base 41 in a leak-proof manner. The opening in the table base 41 communicates with a cylinder 48 having a plunger 49 slidable therein. The cylinder is secured to the table base by strips 50 and the plunger 49 has a bar 51 secured thereto. This bar is provided with a flange 52 on which one end of a compression spring 53 is seated. The opposite end of the spring seats upon the face of the cylinder 48. This spring is adapted to yieldably press against the flange 52 and withdraw the piston 49 toward one end of the cylinder, thus creating a suction in the canal 46. This bar 51 is supported at its end in a lug 54, and at its extreme end is provided with a right-angled handle 55 so that the bar may be gripped and the piston projected into the cylinder to begin a suction stroke. For tilting the sheets loaded on the table, the piston may be retained in tilting position by means of a catch notch 51a in the bar 51 engaging the bar guide edge of the lug 54. For operating the suction mechanism then only requires that the bar 51 be lifted to remove the notch thereon out of engagement with the lug 54 after which the plunger begins the suction stroke. The work carrying table 42, in which the cups 44 are formed, is adapted to be lifted above the table base 41 by a screw mechanism. This mechanism comprises a king bolt 56 secured rigidly to the table 42 in a desirable manner, thus passing through the table base 41, and threaded throughout its length. A bracket 57 is secured to the table base and is so constructed as to support a bevel gear 58 which has a threaded axle opening therein in order to engage the threaded bolt 56. The bevel gear is mounted in the bracket in such manner that it is capable of rotating, but, at the same time, being immovable from its position. Said bevel gear 58 is engaged by a bevel pinion 59, the latter being mounted at the end of a shaft 60, which passes through an extension of the bracket 57 and also through an ear 61 and its projecting end is provided with a crank handle 62 through which means the shaft 60 and bevel pinion 59 are rotated in order to turn the bevel gear 58 to raise or lower the table 42 through means of the threaded bolt 56. In order to provide a precise lifting and lowering of the table 42, said table has fixed on its under surface, stems 42a which are slidably guided in corresponding recesses in the base plate 41 of the table. Each carrier wagon may be provided with a desired number of tiltable and adjustable sheet holder units so that it is possible to work upon sheets of variable edge angle and thickness in one operation.

The machine and assembly illustrated herein is adapted for use where large and continuous production is necessary. The glass plates are rested upon the surface of the tables 42. In order to secure rigidly these glass plates 63 the carriages are provided with vacuum producing means which have their outlet ends communicating with cups 44. Before a glass plate has been mounted upon the table surface 42 the piston 49 is projected into the cylinder. The glass plate is then placed on the table surface 42 to rest on the cups 44. After this operation the bar 51 is released and is then extended out of the cylinder by the spring 53 engaging the flange 52 carrying with it the piston 49 which exerts a suction through the canal 46 and the suction cups 44. The rims of the suction cups may be provided with rubber liners or the like to make the fit between the glass and the table tops secure. This operation may be completed at some point distant from the grinding units 12, one of which is illustrated in Figures 1 and 2. The table and table base and the carriage upon which they are mounted ride upon the rails 10 and 11 at a comparatively slow speed and pass under the first of the units and successively under all of these units. Directly in front of each of the grinding units the rail 37 rises upwardly to a greater height than its previous length and this permits the overbalancing weight 76, mounted on the stud 77, to counterbalance the table and table base 42 and 41 respectively, and causes this table to tilt to one side. This tilting, together with the conical surface 26 of the emery or carborundum wheel 25, wears a beveled surface upon the edge of the glass plate 63 which is the article of work under consideration. At convenient positions along the point of operation between the grinding units, which may have grinding wheels of successively finer texture, a lubricating mechanism, not shown, may be seated.

It is to be noted that certain changes in form and construction may be made without departing from the spirit and scope of the invention.

I claim:

1. In combination, an endless track, carriages tractioned on said track, grinding units arranged side by side alongside of said track, a tiltable table on each one of said carriages, a second track following said first-named track, said second-named track being raised above the remainder of said track at a position opposite to said grinding units, and a hinged rod depending from said table top of each one of said carriages riding on said second-named track adapted to raise one edge of said table top of said carriages to incline the plate glass carried on said table top.

2. In combination, an endless track, carriages tractioned on said track, grinding units arranged side by side alongside of said track, a tiltable table on said carriage, a second track following said first-named track, said second-named track having a portion raised above the remainder of said track at a position opposite to said grinding units, and an arm depending from said table top, a roller at the extremity of said arm riding on said second-named track, said roller and arm forming a tiltable guide for said table top.

3. In combination, an endless track, carriages tractioned on said track, grinding units arranged side by side alongside of said track, a tiltable table on said carriage, a second track following said first-named track, said second-named track having a portion raised above the remainder of said track at a position opposite to said grinding units, and an arm depending from said table top, a roller at the extremity of said arm riding on said second-named track, said roller and arm forming a tiltable guide for said table top, said table top being pivotally mounted on said carriage, a stud extending parallel to said table top, and an over-balancing weight adjustable on said stud.

4. In combination, an endless, substantially oval track, wheel carriages riding on said track, erect grinding units arranged side by side beside said track, a tiltable table, aligned ears on the under side of said table, complemental ears on said carriages, studs passing through the ears of said carriages and said tiltable table, a second track adjacent said first named track and extending parallel thereto; said second named track being deformed to a raised position above the remainder of said second named track at a position aligned with said grinding units, a hinged rod depending downwardly from said table top, a roller pivotally secured to the depending end of said rod, said roller riding upon said second named track, a counter weight mounted beneath the table on the side thereof, and arranged on the side opposite to the position at which the depending rod is located, said counter weight being adapted to tilt said table as the roller rides upon the raised portion of said second named track.

5. In combination, an endless track, wheeled carriages riding on said track, grinding units arranged side by side alongside said track, independent tables, ears on said tables, ears on each of said carriages, studs passing through the ears of the carriages and tables for pivotally securing the latter to said carriages, said ears being offset from the longitudinal center of said tables overbalancing the latter, a counter weight extending from the overbalanced side of each table, second named track having a portion of its length deformed and raised above the remainder of said track, said second named track being U-shaped and having its traction surface on its under side, a hinged rod secured to the underbalanced side of each table and depending from said table, a roller pivoted to the depending end of each rod, said roller riding on the under side of said second named track forming a guide member for determining the amount of tilt of said tables when said rollers ride from the lower level of said second named track to the raised portion thereof.

In testimony whereof I affix my signature.

RUDOLF FÖHRENBACH.